(12) United States Patent
Talasila et al.

(10) Patent No.: US 11,848,828 B1
(45) Date of Patent: Dec. 19, 2023

(54) ARTIFICIAL INTELLIGENCE AUTOMATION TO IMPROVE NETWORK QUALITY BASED ON PREDICTED LOCATIONS

(71) Applicants: AT&T Intellectual Property I, L.P., Atlanta, GA (US); NEW JERSEY INSTITUTE OF TECHNOLOGY, Newark, NJ (US)

(72) Inventors: Manoop Talasila, Branchburg, NJ (US); Anwar Syed Aftab, Budd Lake, NJ (US); Wen-Ling Hsu, Bridgewater, NJ (US); Cristian Borcea, Hillsborough, NJ (US); Yi Chen, Short Hills, NJ (US); Xiaopeng Jiang, Kearny, NJ (US); Shuai Zhao, Bellevue, WA (US); Guy Jacobson, Bridgewater, NJ (US); Rittwik Jana, Montville, NJ (US)

(73) Assignees: AT&T Intellectual Property I, L.P., Atlanta, GA (US); NEW JERSEY INSTITUTE OF TECHNOLOGY, Newark, NJ (US)

( * ) Notice: Subject to any disclaimer, the term of this patent is extended or adjusted under 35 U.S.C. 154(b) by 0 days.

(21) Appl. No.: 17/821,636

(22) Filed: Aug. 23, 2022

(51) Int. Cl.
  *H04L 41/16* (2022.01)
  *G06N 20/00* (2019.01)
  *G06N 3/045* (2023.01)

(52) U.S. Cl.
  CPC ............. *H04L 41/16* (2013.01); *G06N 3/045* (2023.01); *G06N 20/00* (2019.01)

(58) Field of Classification Search
  CPC ......... H04L 41/16; G06N 3/045; G06N 20/00
  See application file for complete search history.

(56) References Cited

U.S. PATENT DOCUMENTS

| 11,210,583 B2 * | 12/2021 | Mathew ................. G06N 20/00 |
| 2022/0092215 A1 * | 3/2022 | Ciobotaru ........... H04L 63/0421 |
| 2022/0114491 A1 * | 4/2022 | Kelly ..................... G06N 3/042 |

OTHER PUBLICATIONS

Bishop, "Neural networks for pattern recognition," Oxford university press, 1995, 498 pages.
Bonawitz et al., "Towards Federated Learning at Scale: System Design," arXiv:1902.01046v2 [cs.LG] Mar. 22, 2019, 15 pages.
(Continued)

*Primary Examiner* — El Hadji M Sall
(74) *Attorney, Agent, or Firm* — Amin, Turocy & Watson, LLP

(57) ABSTRACT

An artificial intelligence (AI) automation to improve network quality based on predicted locations is provided. A method can include training, by a first device comprising a processor and according to model configuration parameters received from a second device that is not the first device, a local machine learning model with training data derived from first location data collected by the first device; transmitting, by the first device to the second device, anonymized model features associated with the local machine learning model; in response to the transmitting of the anonymized model features, receiving, by the first device from the second device, an aggregated machine learning model; and estimating, by the first device, a future position of the first device by applying the aggregated machine learning model to second location data collected by the first device.

20 Claims, 13 Drawing Sheets

(56) References Cited

OTHER PUBLICATIONS

Dash et al., "Next Place Prediction by Understanding Mobility Patterns," The Fourth IEEE International Workshop on the Impact of Human Mobility in Pervasive Systems and Applications, 2015, 6 pages.

De Brebisson et al., "Artificial neural networks applied to taxi destination prediction," ECMLPKDDDC'15: Proceedings of the 2015th International Conference on ECML PKDD Discovery Challenge—vol. 1526, Sep. 2015, 12 pages.

Taranto et al., "Location-aware communications for 5g networks: How location information can improve scalability, latency, and robustness of 5g," IEEE Signal Processing Magazine ( vol. 31, Issue: 6, Nov. 2014), 11 pages.

Feng et al., "DeepMove: Predicting Human Mobility with Attentional Recurrent Networks," WWW '18: Proceedings of the 2018 World Wide Web Conference, Apr. 2018, 10 pages.

Feng et al., "PMF: A Privacy-preserving Human Mobility Prediction Framework via Federated Learning," Proceedings of the ACM on Interactive, Mobile, Wearable and Ubiquitous Technologies, vol. 4, Issue 1, Mar. 2020, Article No. 10, pp. 1-21, 21 pages.

Graepel et al., "ML Confidential: Machine Learning on Encrypted Data," In International Conference on Information Security and Cryptology, pp. 1-21. Springer, 2012, 15 pages.

Gruteser et al., "On the Anonymity of Periodic Location Samples," In Security in Pervasive Computing, pp. 179-192. Springer, 2005, 14 pages.

Hitaj et al., "Deep Models Under the GAN: Information Leakage from Collaborative Deep Learning," CCS'17, Oct. 30-Nov. 3, 2017, Session C3: Machine Learning Privacy, 16 pages.

Hoch, "An Ensemble Learning Approach for the Kaggle Taxi Travel Time Prediction Challenge," DC@PKDD/ECML 7, Sep. 2015, 11 pages.

Kairouz et al., "Advances and Open Problems in Federated Learning," arXiv:1912.04977v3 [cs.LG] Mar. 9, 2021, 121 pages.

Kashiyama et al., "Open PFLOW: Creation and evaluation of an open dataset for typical people mass movement in urban areas," vol. 85, Dec. 2017, pp. 249-267, 19 pages.

Kong et al., "HST-LSTM: A Hierarchical Spatial-Temporal Long-Short Term Memory Network for Location Prediction," Proceedings of the Twenty-Seventh International Joint Conference on Artificial Intelligence (IJCAI-18), 7 pages.

Krumm, "A Survey of Computational Location Privacy," Personal and Ubiquitous Computing, 2008, 9 pages.

Liu et al., "Time-Aware Location Prediction by Convolutional Area-of-Interest Modeling and Memory-Augmented Attentive LSTM," IEEE Transactions on Knowledge and Data Engineering, pp. 1-1, 2020, 13 pages.

Liu et al., "Predicting the Next Location: A Recurrent Model with Spatial and Temporal Contexts," In Proceedings of the Thirtieth AAAI Conference on Artificial Intelligence, AAAI'16, p. 194-200. AAAI Press, 2016, 7 pages.

LV et al., "Multi-scale and multi-scope convolutional neural networks for destination prediction of trajectories," IEEE Transactions on Intelligent Transportation Systems, 2019, 12 pages.

Nguyen et al., "A Potential Approach for Mobility Prediction Using GPS Data," In 2017 Seventh International Conference on Information Science and Technology (ICIST), pp. 45-50, Apr. 2017, 6 pages.

Popa et al., "Privacy and Accountability for Location-based Aggregate Statistics," CCS '11: Proceedings of the 18th ACM conference on Computer and communications security, Oct. 2011, pp. 653-666, 13 pages.

Shafique et al., "Use of acceleration data for transportation mode prediction," Transportation (2015) 42:163-188, 26 pages.

Trasarti et al., "MyWay: Predicting Personal Mobility," Information Systems, 64:350-367, 2017, 27 pages.

Wang et al., "Federated Learning With Matched Averaging," arXiv:2002.06440v1 [cs.LG] Feb. 15, 2020, 16 pages.

Wang et al., "A Hybrid Markov and LSTM Model for Indoor Location Prediction," IEEE Access, 7:185928-185940, 2019, 13 pages.

Wang et al., "Regularity and Conformity: Location Prediction Using Heterogeneous Mobility Data," In Proceedings of the 21th ACM SIGKDD International Conference on Knowledge Discovery and Data Mining, KDD '15, p. 1275-1284, 2015, Association for Computing Machinery, 10 pages.

Wang et al., "Beyond Inferring Class Representatives: User-Level Privacy Leakage From Federated Learning," IEEE INFOCOM 2019—IEEE Conference on Computer Communications, Apr. 2019, 9 pages.

Wu et al., "Modeling Trajectories with Recurrent Neural Networks." Proceedings of the Twenty-Sixth International Joint Conference on Artificial Intelligence (IJCAI-17), 8 pages.

Wu et al., "Mobile Social Data Learning for User-Centric Location Prediction With Application in Mobile Edge Service Migration," IEEE Internet of Things Journal, 6(5):7737-7747, 2019, 11 pages.

Wu et al., "Learning Individual Moving Preference and Social Interaction for Location Prediction," IEEE Access, 6:10675-10687, 2018, 13 pages.

Xu et al., "Venue2Vec: An Efficient Embedding Model for Fine-Grained User Location Prediction in Geo-Social Networks," IEEE Systems Journal, 2019, 12 pages.

Xu et al., "Feeling-based Location Privacy Protection for Location-based Services," In Proceedings of the 16th ACM conference on Computer and Communications Security (CCS), pp. 348-357. ACM, 2009, 10 pages.

Yosinski et al., "How transferable are features in deep neural networks?" arXiv:1411.1792v1 [cs.LG] Nov. 6, 2014, 14 pages.

Zhang et al., "Sparse User Check-in Venue Prediction By Exploring Latent Decision Contexts From Location-Based Social Networks," IEEE Transactions on Big Data ( vol. 7, Issue: 5, Nov. 1, 2021), 15 pages.

Zhang et al., "Mobility Prediction: A Survey on State of-the-Art Schemes and Future Applications," IEEE Access, 7:802-822, 2019, 21 pages.

Zhang et al., "DNN-Based Prediction Model for Spatio-Temporal Data," SIGSPACIAL '16: Proceedings of the 24th ACM SIGSPATIAL International Conference on Advances in Geographic Information Systems, Oct. 2016, Article No. 92, 4 pages.

Zhao et al., "Privacy-Aware Federated Learning for Page Recommendation," Proceedings—2020 IEEE International Conference on Big Data, Big Data 2020, Dec. 10, 2020, 10 pages.

Zhao et al., "Federated Learning with Non-IID Data," arXiv:1806.00582v2 [cs.LG] Jul. 21, 2022, 12 pages.

Zheng et al., "GeoLife: Managing and Understanding Your Past Life over Maps," In The Ninth International Conference on Mobile Data Management (mdm 2008), Apr. 27, 2008, 2 pages.

\* cited by examiner

ARTIFICIAL INTELLIGENCE AUTOMATION TO IMPROVE NETWORK QUALITY BASED ON PREDICTED LOCATIONS

TECHNICAL FIELD

The present disclosure relates to communication networks, and, in particular, to techniques for utilizing artificial intelligence (AI) automation to improve network quality based on predicted locations.

BACKGROUND

Due to the nature of mobile communications, the performance of a cellular network, such as a Fifth Generation (5G) network, can in some cases be sensitive to small changes in location. This can, in turn, adversely affect the performance of mobile applications such as video streaming applications, augmented reality applications, and/or other applications that utilize regular transfers of data, lowering the overall user experience associated with these applications. As a result, it is desirable to implement techniques to improve the resilience of mobile applications to changes in location.

DETAILED DESCRIPTION

Figure 1:
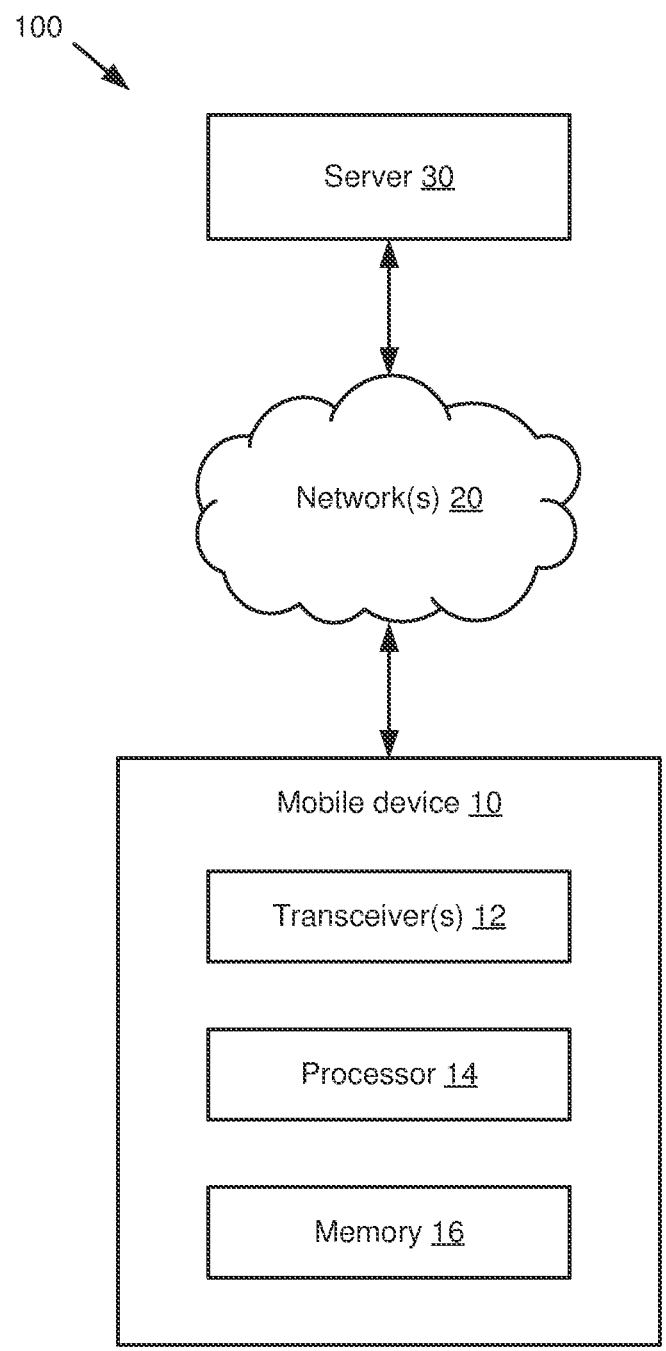
FIG. 1 is a block diagram of a system that facilitates AI automation to improve network quality based on predicted locations in accordance with various aspects described herein.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

In an aspect, a method as described herein can include training, by a first device including a processor and according to model configuration parameters received from a second device that is not the first device, a local machine learning model with training data derived from first location data collected by the first device. The method can further include transmitting, by the first device to the second device, anonymized model features associated with the local machine learning model. The method can further include, in response to the transmitting of the anonymized model features, receiving, by the first device from the second device, an aggregated machine learning model. The method can additionally include estimating, by the first device, a future position of the first device by applying the aggregated machine learning model to second location data collected by the first device.

In another aspect, a system as described herein can include a processor and a memory that stores executable instructions that, when executed by the processor, facilitate performance of operations. The operations can include training, based on configuration parameters received from network equipment that is distinct from the system, a local machine learning model with training data based on first location data associated with the system; sending, to the network equipment, anonymized model data associated with the local machine learning model; in response to the sending of the anonymized model data, receiving, from the network equipment, a global machine learning model; and estimating a future position associated with the system by applying the global machine learning model to second location data associated with the system.

In a further aspect, a non-transitory machine-readable medium as described herein can include executable instructions that, when executed by a processor of a first device, facilitate performance of operations. The operations can include, based on model configuration data received from second network equipment that is distinct from the first network equipment, training a local data model with training data derived from first location data collected by the first network equipment; transmitting, to the second network equipment, anonymized model parameter data associated with the local data model; and determining an estimated future position of the first network equipment by applying a global data model, received from the second network equipment in response to the transmitting, to second location data collected by the first network equipment.

Referring first to FIG. 1, a system 100 that facilitates AI automation to improve network quality based on predicted locations is illustrated. System 100 as shown by FIG. 1 includes a mobile device 10 that can communicate using resources enabled via one or more networks 20. In an implementation, the mobile device 10 can be a network equipment device, and/or any device that is capable of network communication and not fixed to a physical location. By way of example, the mobile device 10 can be a smartphone, a tablet or laptop computer, a smart watch or other wearable device, and/or any other suitable device presently existing or developed in the future. In some cases, the mobile device 10 can receive network connectivity from another device that is physically and/or communicatively coupled to the device, such as a portable hotspot or other network adapter.

The network 20 shown in FIG. 1 can be a cellular communication network, e.g., a Long Term Evolution (LTE) and/or Fifth Generation (5G) cellular network. Also or alternatively, the network 20 could operate according to other suitable network technologies, such as Wi-Fi, BLUETOOTH®, or the like. While only one network 20 is shown in FIG. 1 for simplicity of illustration, it is noted that the mobile device 10 can communicate with any number of networks 20, including one network and multiple networks. Additionally, while various references are made in this description to particular network technologies, it is noted that these references are made solely as non-limiting examples of network technologies that could be used in accordance with various implementations as described herein and that other technologies could also be used.

As further shown in FIG. 1, the mobile device 10 can communicate with a server 30 via the network 20. While only one server 30 is illustrated in FIG. 1 for simplicity of illustration, it is noted that the mobile device 10 could communicate with any number of servers 30 via any number of networks 20. Operation of the server 30 is described in further detail below with respect to, e.g., FIGS. 7-9.

The mobile device 10 shown in FIG. 1 includes one or more transceivers 12 that can communicate with (e.g., transmit messages to and/or receive messages from) the server 30 and/or other devices in system 100, e.g., via the network 20. The transceiver 12 can include respective antennas and/or any other hardware or software components (e.g., an encoder/decoder, modulator/demodulator, etc.) that can be utilized to process signals for transmission and/or reception by the mobile device 10 and/or associated devices.

The mobile device 10 shown in FIG. 1 further includes a processor 14 and a memory 16, which can be utilized to facilitate various functions of the mobile device 10. For instance, the memory 16 can include a non-transitory computer readable medium that contains computer executable instructions, and the processor 14 can execute instructions stored by the memory 16. For simplicity of explanation, various actions that can be performed via the processor 14 and the memory 16 of the mobile device 10 are shown and described below with respect to various logical components. In an aspect, the components described herein can be implemented in hardware, software, and/or a combination of hardware and software. For instance, a logical component as described herein can be implemented via instructions stored on the memory 16 and executed by the processor 14. Other implementations of various logical components could also be used, as will be described in further detail where applicable. In addition, an example computer architecture that can be utilized wholly or in part to implement various logical components described herein is described in further detail with respect to FIG. 13.

The processor 14 and the memory 16 of the mobile device 10, in various implementations as described below, can provide highly accurate location prediction from location data, e.g., Global Positioning System (GPS) traces or the like, in a manner that is feasible to execute on a smartphone or similar device. This location prediction can be fine grained in both the spatial and temporal scales, e.g., with prediction error within the range of conventional GPS error and the ability to predict locations at temporal steps of one minute or less. Additionally, this location prediction can be utilized for pedestrians and bicyclists, which generally demonstrate less predictable movement than motor vehicles. Predicted locations determined in this manner can, in turn, be utilized to improve the performance of a network or applications enabled via the network, e.g., augmented reality, mobile gaming, video streaming, or the like.

Additionally, the processor 14 and the memory 16 of the mobile device 10 can operate based on information derived from location data rather than the location data itself. As a result, location prediction as performed by the mobile device 10 can provide a high degree of accuracy even for locations that have not previously been visited by a given device user. Further, location prediction as described herein can be performed without exposing personally identifying data outside the mobile device 10, thereby protecting user privacy.

Figure 2:
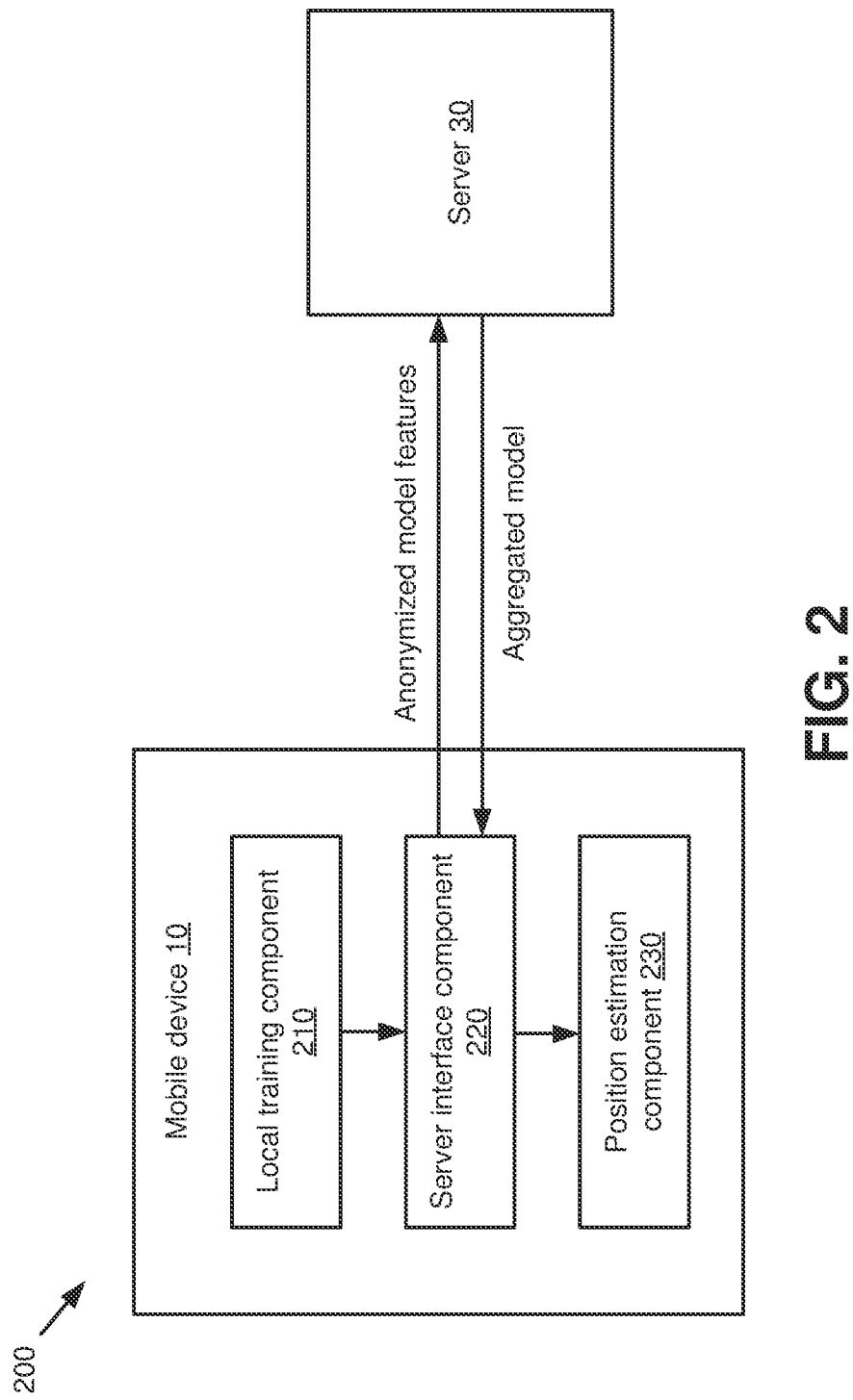
FIG. 2 is a block diagram that depicts the functionality of the mobile device of FIG. 1 in further detail in accordance with various aspects described herein.

With reference now to FIG. 2, a block diagram of a system 200 that facilitates AI automation to improve network quality based on predicted locations is illustrated. Repetitive description of like elements employed in other embodiments described herein is omitted for brevity. System 200 as shown in FIG. 2 includes a mobile device 10 that can operate in a similar manner to that described above with respect to FIG. 1.

With reference now to FIG. 2, a block diagram of a system 200 that facilitates AI automation to improve network quality based on predicted locations is illustrated. Repetitive description of like elements employed in other embodiments described herein is omitted for brevity. System 200 as shown in FIG. 2 includes a mobile device 10 that can operate in a similar manner to that described above with respect to FIG. 1. The mobile device 10 shown in FIG. 2 includes a local training component that can train, according to model configuration parameters received from a server 30 (or other suitable device that is not the mobile device 10), a local machine learning model with training data that is derived from location data collected by the mobile device 10. In an implementation, the training data can include meta-location data, which is described in further detail below with respect to FIGS. 3-4.

As further shown in FIG. 2, the mobile device 10 of system 200 includes a server interface component 220 that can transmit, to the server 30 and/or another suitable device, anonymized model features that are associated with the local machine learning model utilized by the local training component 210. In response to transmitting the anonymized model features, the server interface component 220 can further receive, from the server 30 and/or a different device, an aggregated (global) machine learning model.

The mobile device 10 of system 200 additionally includes a position estimation component 230 that can, upon receiving the aggregated or global machine learning model via the server interface component 220, estimate a future position of the mobile device 10 by applying the received aggregated or global machine learning model to additional location data collected by the mobile device 10. Location data associated with the mobile device 10 that is utilized by the position estimation component 230 can be the same as, or different from, the location data utilized by the local training component 210 as described above.

In an implementation, the mobile device 10 of system 200 can perform a technique referred to herein as federated meta-location learning (FMLL). FMLL, as utilized by the mobile device 10, can incorporate three main components: meta-location generation, a prediction model, and a federated, privacy-preserving learning framework. Meta-location data, as will be described in further detail herein with respect to FIGS. 3-4, can represent device location data as relative points in an abstract two-dimensional (2D) space, e.g., a grid of fixed-size cells. As will be described herein, meta-location can enable training on data received from multiple physical locations and can reduce prediction bias introduced by using raw location data. The prediction model, as will be described in further detail herein with respect to FIGS. 5-6, can utilize multiple sub-models to learn the speed and direction of mobile users as well as information about user movement preferences. The federated, privacy preserving learning framework, as will be described in further detail below with respect to FIGS. 7-9, can protect user privacy by combining federated learning with the abstract 2D representation of user location data facilitated by meta-location.

Figure 3:
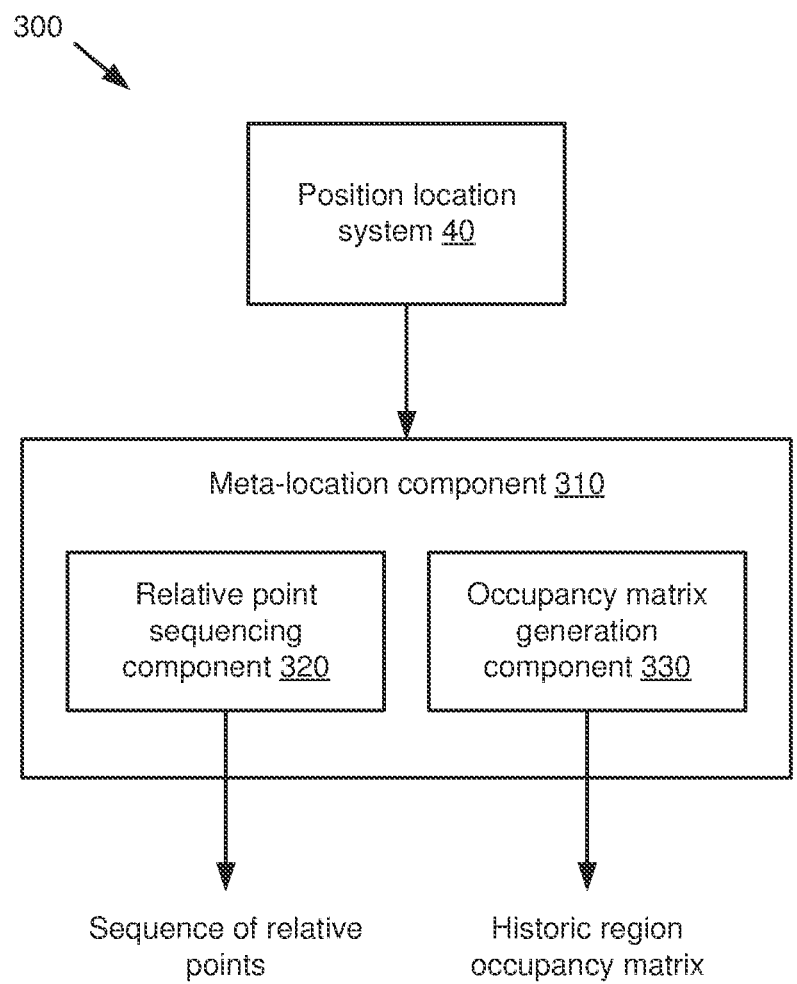
FIG. 3 is a block diagram of a system that facilitates generation of meta-location data in accordance with various aspects described herein.

Turning to FIG. 3, a block diagram of a system 300 that facilitates generation of meta-location data in accordance with various aspects described herein is illustrated. Repetitive description of like elements employed in other embodiments described herein is omitted for brevity. System 300 as shown in FIG. 3 includes a position location system 40, which can be associated with a mobile device (e.g., a mobile device 10 as shown in FIGS. 1-2) or other suitable device. The position location system 40 can collect, measure, or otherwise determine position data for one or more associated devices according to one or more position location techniques known in the art. By way of example, the position location system 40 can utilize satellite positioning (e.g., GPS), cellular triangulation positioning, inertial positioning, and/or other suitable techniques.

In an implementation, the position location system 40 can construct a data sequence that is representative of a history of physical locations of an associated device within an area, e.g., as collected at intervals of a regular or irregular period. The area associated with this data sequence can be any suitable defined geographical space, such as a city or a portion of a city (e.g., a city block, a public square, etc.), a geometric region of a predefined size (e.g., a square region of a given area or side length), or the like.

As further shown in FIG. 3, the position location system 40 can provide the data sequence described above to a meta-location component 310, which can derive meta-location data, or other model training data, from the input data sequence. As shown in FIG. 3, the meta-location component 310 includes a relative point sequencing component 320 that can determine a second data sequence that is representative of amounts of relative spatial displacement of the device associated with the position location system 40 between the physical locations represented in the input data sequence. As shown in FIG. 3, the data sequence generated by the relative point sequencing component 320 is referred to herein as a sequence of relative points.

The meta-location component 310 of system 300 further includes an occupancy matrix generation component 330 that can determine an occupancy matrix, e.g., that is representative of frequencies at which the physical locations represented in the input data sequence are located within respective defined sub-areas of the area associated with the input data sequence. Stated another way, the occupancy matrix generation component 330 can generate a histogram, in matrix form, corresponding to the defined sub-areas associated with each physical location in the input data sequence. As shown in FIG. 3, the matrix generated by the occupancy matrix generation component 330 is referred to herein as a historic region occupancy matrix.

In an implementation, the position location system 40 can collect information associated with travel direction, speed, user movement preferences, road characteristics, and/or other information present in GPS trajectories and/or other data generated by the position location system 40. The meta-location component 310 can then process this raw location data to generate meta-location, which represents trajectories as relative points in an abstract 2D space.

In another implementation in which the position location system 40 includes a GPS sensor embedded in a mobile device, raw location data can be recorded by the mobile device using the embedded GPS sensor. In the following description, $L_t=(lat_t, lon_t)$ denotes the latitude and longitude of a given user at time t. In some instances, learning can be performed based on the transportation mode, such as walking or bicycling. As a result, only the data specific to the desired transportation mode can selected for further processing in such instances. If the transportation mode is not explicitly known, it can be inferred from accelerometer data and/or other data associated with the mobile device.

Figure 4:
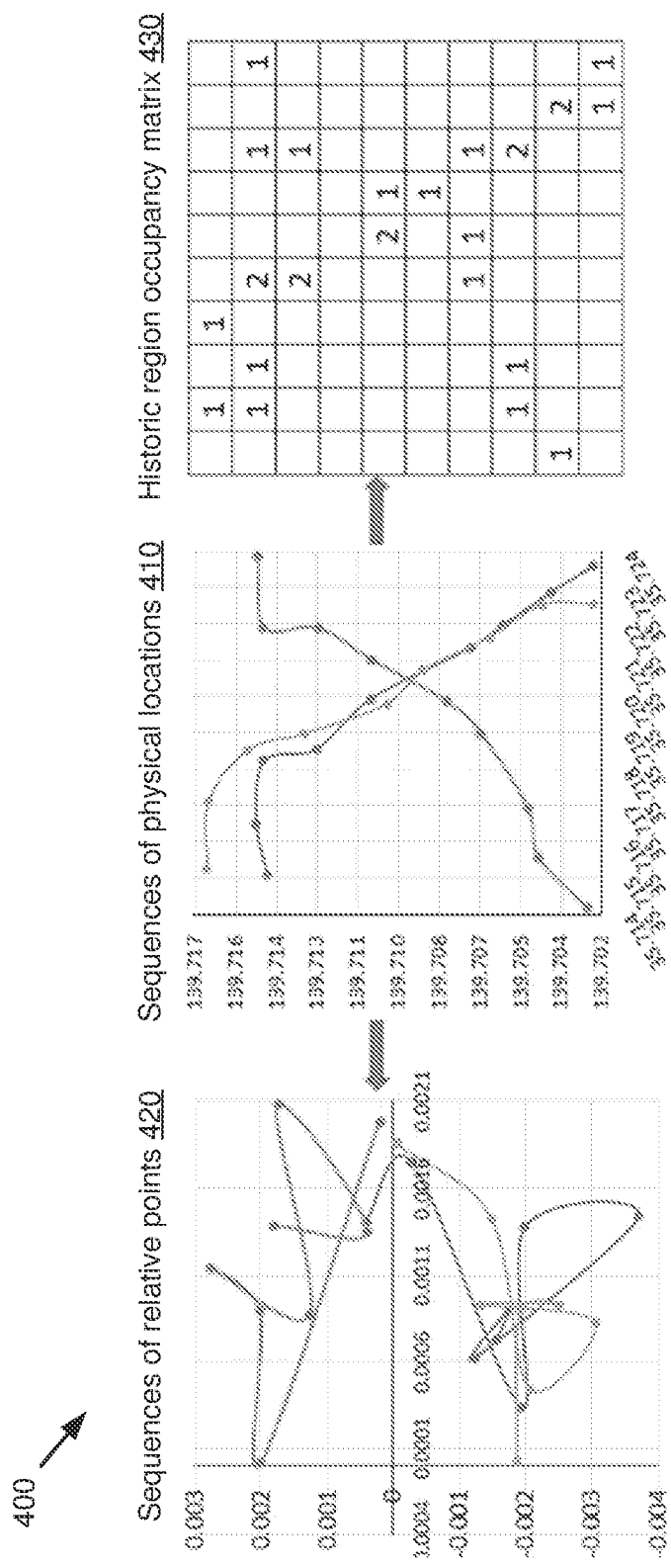
FIG. 4 is a diagram depicting respective types of meta-location data that can be generated by the system of FIG. 3 in accordance with various aspects described herein.

Referring next to FIG. 4 and with further reference to FIG. 3, diagram 400 illustrates example meta-location data that can be generated from input sequences of physical locations 410 (also referred to herein as simply input sequences). In an implementation, raw location data for a given user as provided via the sequences of physical locations 410 can be processed, e.g., as shown in FIG. 3, to produce fixed-length sequences of relative points 420 and historic region occupancy matrices 430 (also referred to herein as simply occupancy matrices) of a given space considered for prediction (e.g., the area associated with the physical locations as described above with respect to FIG. 3) for the corresponding user. The input sequences 410 shown in diagram 400 can contain the speed and direction information of respective trajectories of a user. The occupancy matrices can record frequently visited places and the most likely trajectories between these places. The inputs can computed offline (e.g., when an associated device is charging) and can be updated over time based on new data to enable re-training.

To generate the input sequences, the relative point sequencing component 320 can split user trajectories into fixed-length sub-trajectories. The length in time of the trajectories can be determined experimentally. Each sub-trajectory can be transformed into a sequence of relative points in an abstract 2D space. The X and Y coordinates of relative points at time t can be determined based on their offsets from the location at previous time step t-1. In this process, the location of the very first point in a trajectory session can be excluded. As used herein, a location offset determined in this manner is denoted as $\Delta L_t=(lat_t-lat_{t-1}, lon_t-lon_{t-1})$. Additionally, an input sequence associated with a time t that looks back k steps can be denoted as $S_t=(\Delta L_{t-k+1}, \Delta L_{t-k+2}, \ldots, \Delta L_{t-1}, \Delta L_t)$. In its training, the meta-location component 310 can consider all possible k-length sequences, including overlapping sequences.

The occupancy matrix generation component 330 can extract the historic region occupancy matrices 430 from a historic occupancy matrix of the entire space (e.g., a city). The occupancy matrix generation component 330 can divide the entire space into a grid of fixed-size cells, where each cell corresponds to an element in the historic occupancy matrix. Each numerical element shown in the cells represents the number of visits of a given user in its corresponding cell. The matrix represents the occupancy of a bounded region $R_t$ with area A, which is centered at the physical location $L_t$ at time t. $R_t$ is divided into M×M fixed-size grid-cells, where A and M are predefined constants based on the maximum speed of users and the desired spatial granularity for the prediction. Each historic region occupancy matrix $H_t$ is a M×M matrix and is extracted by the occupancy matrix generation component 330 from the historic occupancy matrix for the entire space. Once extracted, this matrix is a meta-location input that does not maintain any relation with the physical locations that it represents. A matrix can implicitly tell if a road exists in a given cell (e.g., based on a non-zero value for the corresponding matrix element) and can also tell if adjacent cells form routes taken frequently by the user.

In some instances, a historic region occupancy matrix 430 as shown in diagram 400 can be generated from the numbers of visits to all grid cells, which could be determined based on data that is different from temporal sequences of physical locations as described above. Further, it is noted that the sequences of relative points 420 as shown in diagram 400 do not resemble the corresponding physical sequences, which assists in location privacy protection. Overall, different physical locations can be mapped to the same meta-locations. This not only helps repeated patterns to be extracted from different physical locations, but also protects the data from malicious actors that could attempt to infer the physical locations.

Generation and use of meta-location as shown in FIGS. 3-4 can provide several benefits. First, because different meta-location sequences have the same magnitude, they are suitable for use as deep learning data. Deep learning algorithms minimize the distance between two data points as a loss function. During this minimization, high-magnitude data weighs more than low-magnitude data, which can lead to bias. For example, if physical location sequences are used directly, the training can focus on minimizing the loss for data with high latitude and high longitude values. Additionally, meta-location removes the need to scale location sequences to the same range, which would remove the traveling speed from the data and render the data more difficult to process.

Another benefit is the ability to change configuration parameters in a data representation to perform prediction at different levels of spatial granularity. For example, a grid-cell size can be 10 m×10 m for pedestrians, and 40 m×40 m for bicyclists. Instead of predicting coordinates as arbitrary numerical values without a target granularity, meta-location can enable categorical formulation of the model output with a specified granularity and use accuracy to quantify the model performance. This can also benefit applications that utilize specific levels of spatial and temporal granularity from the model.

An additional benefit is location privacy protection. This can be achieved in conjunction with federated learning (as will be discussed in more detail below with respect to FIGS. 7-9), which shares only the model gradients with the server. Because learning occurs on the mobile devices, no personal data is transferred from the mobile devices. It is noted, however, that local model gradients can still leak private location information if the federated learning model uses physical location data. This problem is substantially mitigated by the use of meta-location, which can contain the essential information for location prediction, including speed, direction, and user movement preferences, while not disclosing the physical location of the user.

A further benefit is the extraction of repeated patterns across different physical locations. When learning directly from different physical locations, deep learning models can encounter entirely different samples. However, because all meta-location data uses the same abstract 2D space, different physical locations could show relative similarities. This can speed up learning due to the presence of more similar meta-location samples.

Figure 5:
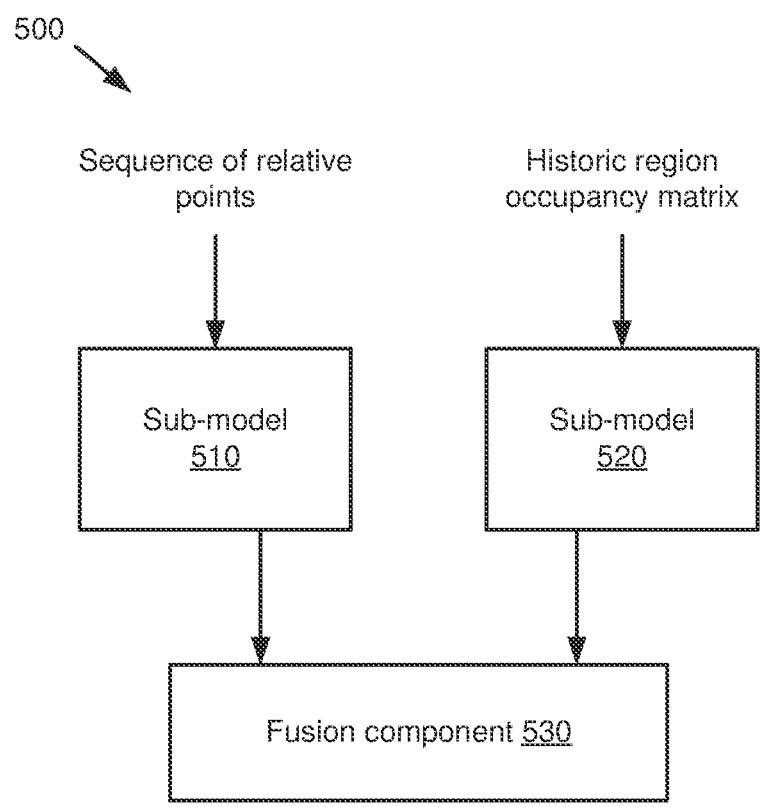
FIG. 5 is a block diagram of a system that facilitates location prediction based on meta-location data in accordance with various aspects described herein.

Referring now to FIG. 5, a block diagram of a system 500 that facilitates location prediction based on meta-location data is illustrated. Repetitive description of like elements employed in other embodiments described herein is omitted for brevity. System 500 as shown in FIG. 5 represents the structure of a machine learning model that can be utilized to generate predicted location data for a given user based on meta-location data associated with that user, e.g., as described above with respect to FIGS. 3-4.

System 500 as shown in FIG. 5 operates as a multi-step model, in which two sub-models 510, 520 are applied to sequences of relative points and historic region occupancy matrices, respectively, to produce intermediate model outputs. The intermediate outputs of the sub-models 510, 520 can then be provided to a fusion component 530, which can determine estimated future position data based on fusing the intermediate outputs provided by the sub-models 510, 520. In an implementation, the sub-model 510 that processes the sequence of relative points can be a neural network and/or other machine learning model for sequence prediction, while the sub-model 520 that processes the historic region occupancy matrix can be a neural network and/or other machine learning model that utilizes visual feature prediction techniques.

In an implementation, a location to be predicted $L_{t+i}$ can be mapped into the region R, e.g., as discussed above with respect to FIG. 4. For instance, the fusion component 530 can build a prediction matrix $Y_{t+i}$ as shown in Equation 1 below:

$$y_{i,j,t+i} = \begin{cases} 1, & \text{if } L_{t+1} \in R_{i,j} \\ 0, & \text{otherwise} \end{cases}, \quad (1)$$

where $y_{i,j,t+i}$ is an element of $Y_{t+i}$ and $R_{i,j}$ ($1 \leq i, j \leq M$) is a cell in region R. The meta-location output can be formulated as a categorical class rather than a numerical value, e.g., so that the spatial granularity of the prediction can be set as a constant. Another reason for using categories is that the historic region occupancy matrix does not contain information to enable prediction with spatial granularity beyond the grid-cell size. Overall, the output of the fusion component 530 can be a relative grid cell, which can be converted into a physical grid cell on a corresponding user device.

Figure 6:
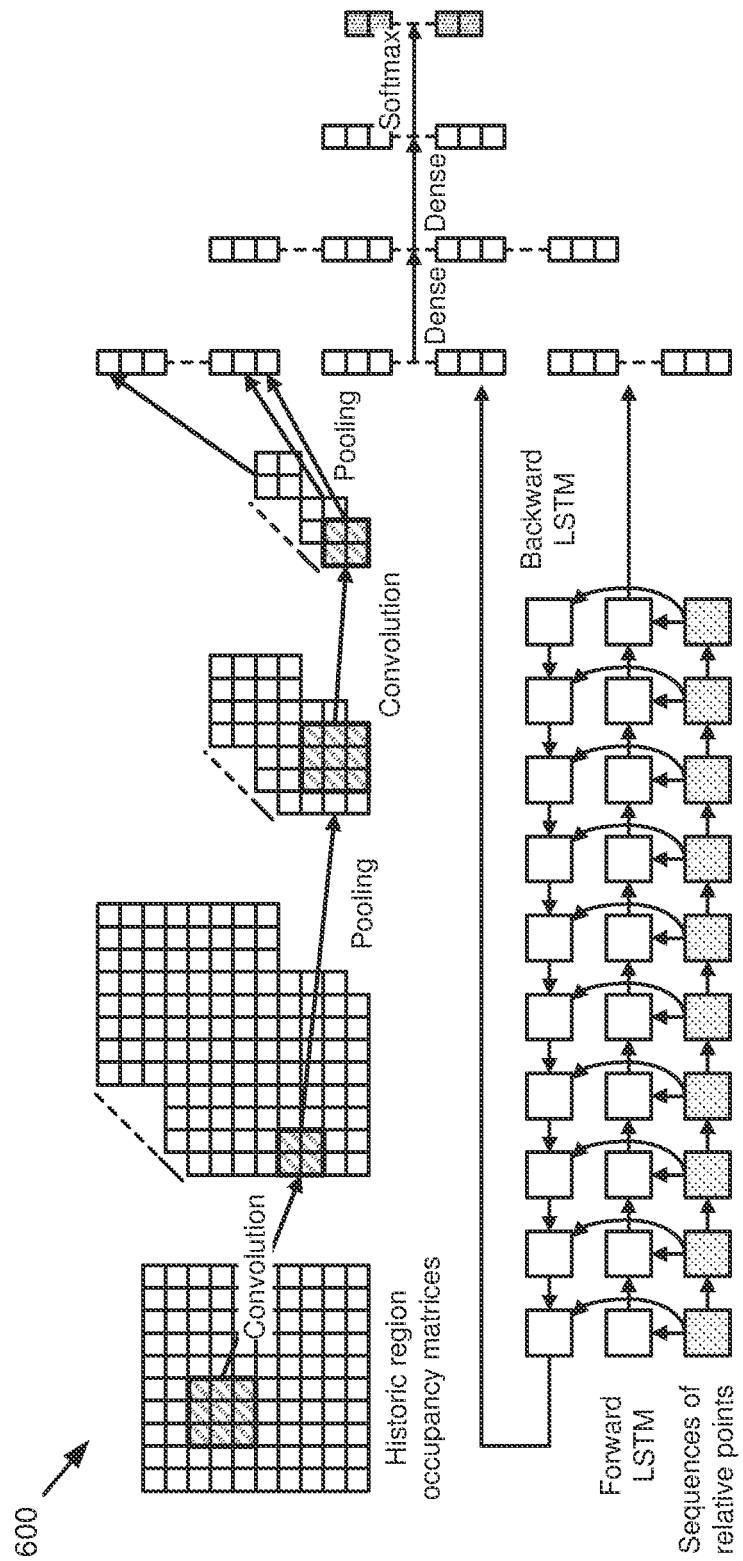
FIG. 6 is a graphical illustration of an example implementation of the system of FIG. 5 in accordance with various aspects described herein.

Referring next to FIG. 6, and with further reference to FIG. 5, diagram 600 is a graphical representation of an example implementation of system 500 in which the first sub-model 510 is a convolutional neural network (CNN) and the second sub-model 520 is a bidirectional long short-term memory (BiLSTM) model. It is noted, however, that the below description is merely one example of machine learning models that can be utilized by system 500 and that other models could also be used.

In an implementation, system 500 can operate based on meta-location input and output, e.g., as described above. In the following description, $S_t \in R^{2k}$ denotes the size-k sequence of relative points at time t for a given user. Additionally, $H_t \in Z_+^{M \times M}$ denotes the historic regional occupancy matrix of the same user, which is a square matrix of order M centered at the user location at time t. Based on these definitions, system 500 can predict the relative location of this user, denoted as $\hat{Y}_{t+i} \in Z_2^{M \times M}$, for the future i-th timestamp, which can be done as shown in Equation 2 below:

$$\hat{Y}_{t+i} = F(S_t, H_t), \quad (2)$$

where F is the deep learning model for location prediction. The predicted location is a cell in the M×M grid representation of the space surrounding the current location of the user.

In the specific, non-limiting example shown by diagram 600, the model can fuse BiLSTM and CNN, where BiLSTM learns the speed and direction of user mobility from the sequences of relative points, and CNN learns user movement preferences and likely user routes from the historic region occupancy matrix. As shown in diagram 600, BiLSTM and CNN work in parallel. A densenet-type connection can be used to fuse BiLSTM and CNN, and softmax activation can be adapted to produce an output corresponding to a predicted grid cell in which the user will be. Batch normalization and dropout layers can be added in BiLSTM and/or CNN to avoid over-fitting, but for simplicity this is not shown in diagram 600. The architecture shown in diagram 600 can be designed, e.g., to capture as much user-level information as possible.

For training, user devices can utilize meta-location input derived from physical locations, which can be precomputed (e.g., as described above). For prediction, the sequence input can be generated in substantially real time, e.g., based on the last k recorded GPS locations. The historic region occupancy matrix, centered at the current location, can also be extracted in real time from the precomputed historic occupancy matrix for the entire space as described above. Operation of the BiLSTM and CNN components shown in diagram 600 will now be described in further detail.

BiLSTM. Sequences of relative points, as described above, can contain information related to travel speed and direction. The model can use BiLSTM to learn sequences with a targeted spatial and temporal granularity. An LSTM unit can be composed of a cell, an input gate, an output gate, and a forget gate. In this implementation, the cell remembers values over arbitrary time intervals, and the three gates regulate the flow of information into and out of the cell. In BiLSTM, one LSTM reads the relative location sequence forward, while a second LSTM reads it backward. The final two layers of hidden states are then concatenated, and the concatenation of these layers captures the speed and direction of respective users.

CNN. While knowing an exact speed and direction can be used to determine a next location, predicted speed and direction can be tuned with other information for better learning. Accordingly, the model as shown in diagram 600 uses CNN on the historic region occupancy matrices, associated with the sequences fed into BiLSTM, to capture spatial features such as user movement preferences, relative likelihoods of routes to be followed by a user between two points, etc. CNN can learn this type of information because the historic region occupancy matrices contain information reflecting both occupancy frequency (explicit) and movement trajectory (implicit). CNN as shown in diagram 600 can include batch normalization, convolution, max pooling, RELU activation, and dropout. With help from convolution and pooling, CNN can capture local connectivity and shift invariance. In the example shown in diagram 600, local connectivity can be the direction to which a user prefers to turn at a given intersection. Additionally, it is noted that the road characteristics are generally shift-invariant because road networks in respective cities typically follow similar urban design and are generally similar in different areas.

Fusion. Although sequences of relative points and historic region occupancy matrices can be fit into a predicted next location by BiLSTM and CNN, respectively, fusing the complementary information generated by them can significantly improve the model performance. In the example shown by diagram 600, the output layers from BiLSTM and CNN are fused by concatenation, which allows for different-length outputs from BiLSTM and CNN. Subsequently, the concatenated output can be fed into fully connected densenets. The final output can be computed by softmax activation, as shown in Equation 3 below, where k corresponds to the k-th grid-cell, n=M×M is the total number of grid cells, $\hat{Y}_k$ is the k-th element of the output $\hat{Y}$, and $\varphi_k$ is the k-th element of the final hidden layer before activation. The dense layers can gradually extract features of a desired length, and softmax can convert the extracted features into probabilities. The output $\hat{Y}$ as shown above contains the predicted probabilities of the future user location in each grid cell.

$$\hat{y}_k = \frac{\exp(\varphi_k)}{\sum_{i=1}^{n} \exp(\varphi_i)} \tag{3}$$

In an implementation, system 500 can use cross entropy loss for optimization. For instance, the model can learn a parameter w by minimizing the cross entropy loss measurement, e.g., according to Equation 4 below. In Equation 4, $y_i$ is the i-th element of the ground truth Y, where the grid cell corresponding to the future location of a user is set to 1 and all cells are set to 0.

$$w^* = \arg \min_w -\frac{1}{n} \sum_{i=1}^{n} y_i \cdot \log(\hat{y}_i) \tag{4}$$

Figure 7:
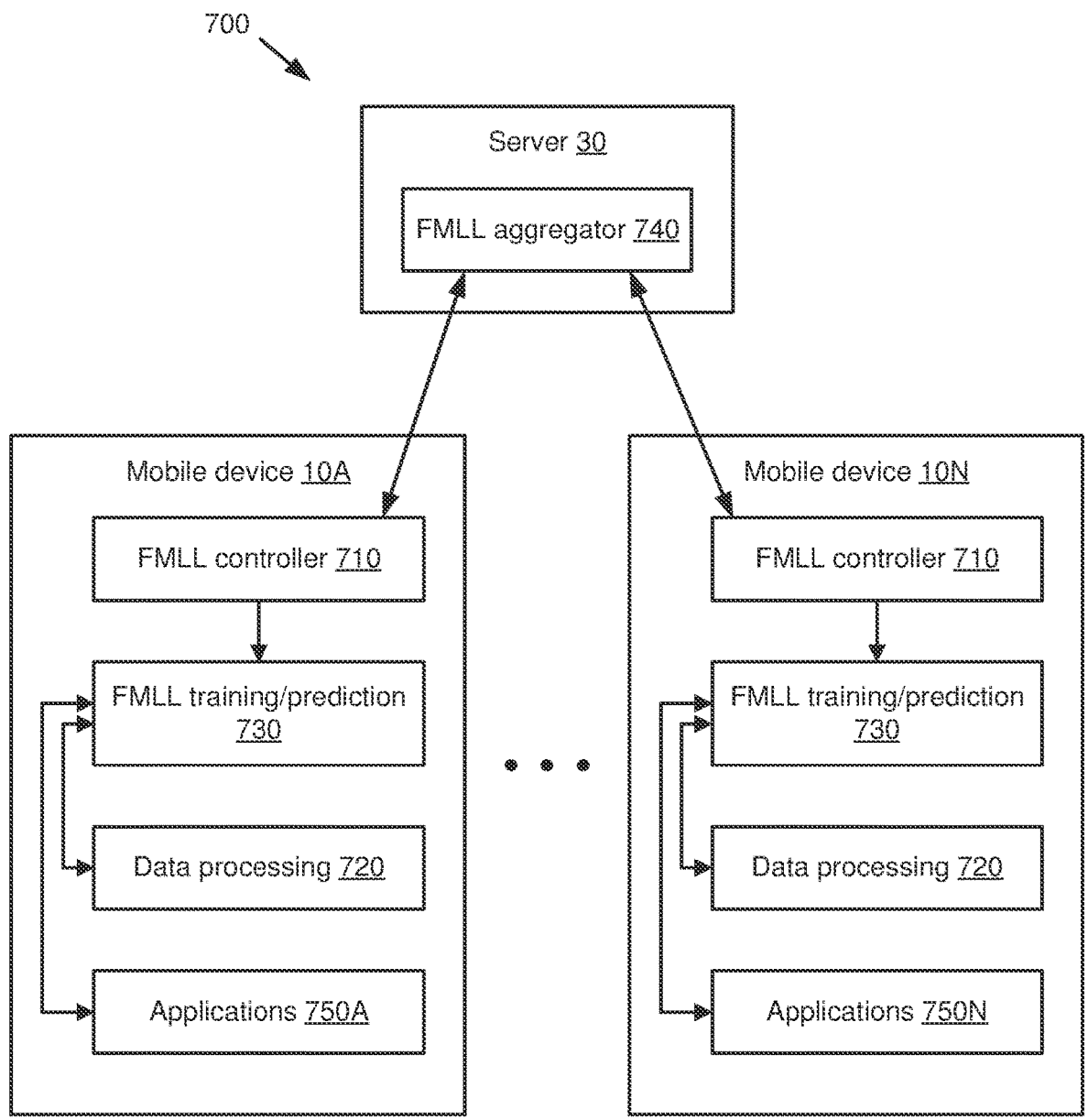
FIG. 7 is a block diagram of a system that facilitates federated learning for a location prediction model in accordance with various aspects described herein.

Turning now to FIG. 7, a block diagram of a system 700 that facilitates federated learning for a location prediction model is illustrated. Repetitive description of like elements employed in other embodiments described herein is omitted for brevity. System 700 as shown in FIG. 7 includes a group of mobile devices 10A-10N, each of which can communicate with a server 30. While only two mobile devices 10A, 10N are shown in FIG. 7 for simplicity of illustration, it is noted that system 700 could include any number of mobile devices 10, provided that at least two mobile devices 10 are present. It is further noted that the naming convention utilized in the labeling of mobile devices 10A and 10N is for illustrative purposes only and is not intended to imply any particular number of mobile devices.

In an implementation, system 700 can be utilized as a framework for federated meta-location learning (FMLL), which can be utilized to facilitate fine-grained (e.g., low-level and detailed) location prediction. System 700 can utilize framework software that runs on the server 30 and the mobile devices 10A-10N in order to enable federated learning (FL) across all users. Each mobile device 10A-10N of system 700 includes a FMLL controller 710, which can mediate communication between the server 30 and the mobile devices 10. The mobile devices 10A-10N of system 700 further include a data processing module 720 that can process physical location data and generate meta-location for training, e.g., as described above with respect to FIGS. 3-4. The mobile devices 10A-10N of system 700 further include an FMLL training and prediction module 730, which can perform local model training on the respective mobile devices 10A-10N and submit the resulting model gradients to the server 30 via the respective FMLL controllers 710.

The server 30 of system 700 includes an FMLL aggregator module 740, which can aggregate the gradients of the local models obtained from the mobile devices 10A-10N. The resulting aggregated model can then be distributed back to the mobile devices 10A-10N by the FMLL aggregator module 740. Subsequently, in the event that an application 750A-750N on a mobile device 10A-10N desires a location prediction, the FMLL training and prediction module 730 can be invoked to obtain a meta-location output. This meta-location output can then be converted into a physical location, e.g., via the data processing module 720.

As model training and prediction occurs locally on the mobile devices 10A-10N, system 700 enables the transfer of anonymized model features, e.g., by the FMLL controller 710 of the respective mobile devices 10A-10N, without transferring any raw location data, meta-location data, or other potentially identifying information to the server 30. Additionally, by enabling the aggregation of anonymized model features across multiple distinct devices, the FMLL aggregator module 740 can facilitate improved model accuracy and performance as compared to a wholly local model implementation.

Figure 8:
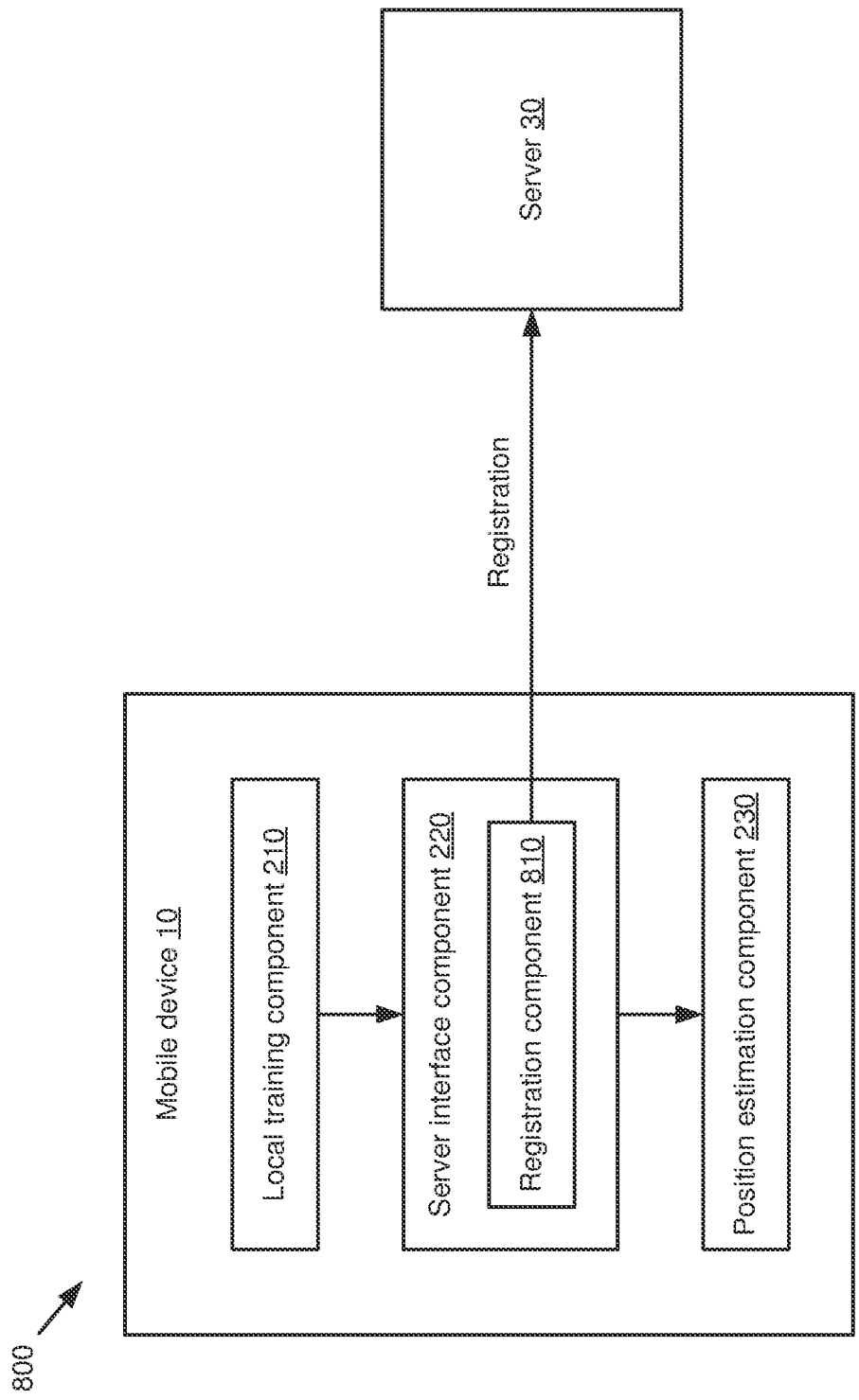
FIG. 8 is a block diagram of a system that facilitates device registration for federated learning in accordance with various aspects described herein.

Referring now to FIG. 8, a block diagram of a system 800 that facilitates device registration for federated learning is illustrated. Repetitive description of like elements employed in other embodiments described herein is omitted for brevity. System 800 as shown in FIG. 8 includes a mobile device 10 with a local training component 210, a server interface component 220, and a position estimation component 230 that can operate as described above, e.g., with respect to FIG. 2. As further shown in FIG. 8, the server interface component 220 of the mobile device 10 includes a registration component 810, which can facilitate registering the mobile device 10 with a server 30, e.g., to enable federated learning as described above with respect to FIG. 7. As will be further discussed with reference to FIG. 9, the server interface component 220 can be configured to receive model configuration parameters, and/or other data, from the server 30 in response to successful registration via the registration component 810.

Figure 9:
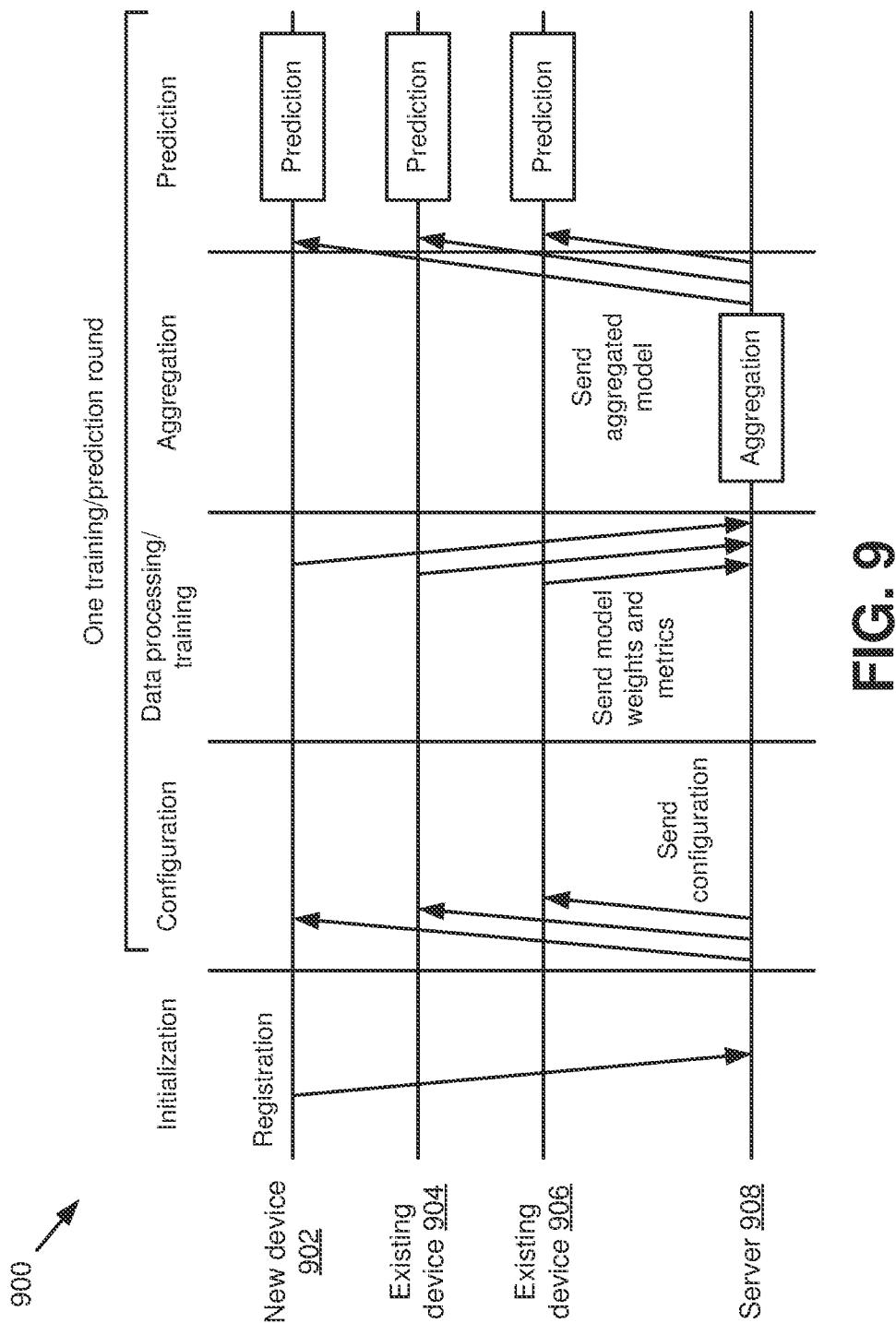
FIG. 9 is a diagram depicting an example federated learning process that can be performed in accordance with various aspects described herein.

Turning to FIG. 9, a diagram 900 depicting an example federated learning process that can be performed in accordance with various aspects described herein is provided. More particularly, diagram 900 illustrates actions that can be performed by a new device 902, two existing devices 904, 906, and a server 908. As used in diagram 900, a "new device" refers to a user device, e.g., a mobile device 10 as described above, that has not previously registered with the server 908. While a total of three devices 902, 904, 906 are shown in diagram 900 for purposes of illustration, it is noted that any number of devices could perform the operations shown by diagram 900. Additionally, diagram 900 illustrates example operations that can be performed during an initialization phase followed by one training/prediction round. It is noted that training/prediction rounds can reoccur, e.g., periodically or on demand, with the operations shown in diagram 900. It is further noted that device initialization could occur at the start of, or the close of, any training/prediction round.

In order to deploy and evolve a global model while respective users collect location data over time, diagram 900 illustrates an example FMLL learning framework with five computation and communication stages. During these stages, the devices 902-906 and the server 908 interact with each other and jointly contribute to the model. As noted above, respective stages can be executed periodically, e.g., in rounds. In each round, the model can be fine tuned by retraining from the existing model. In the following, each stage shown in diagram 900 is described in turn.

(1) Initialization. Newly participating devices, such as the new device 902, can register with the server 908, e.g., as described above with respect to FIG. 8, to ensure that the server 908 knows when model gradients uploaded at different times come from the same user. In some implementations, registration could further allow the server 908 to remove potential malicious users who may inject fake data into the model.

(2) Configuration. A training/prediction round starts with the configuration stage. In this stage, the server 908 informs the devices 902-906 of the deadline to participate in training (e.g., the end of stage 3, as described below). The server 908 can select a subset of the connected devices 902-906 based on the optimal number of participating users in each round and the availability of training data. During this stage, the server 908 can send configuration parameters to the devices 902-906, e.g., relating to the manner in which to generate meta-location for training. Parameters such as sequence length, matrix size, grid size, or the like can vary according to the desired spatial accuracy of the prediction. The server 908 can, in this stage, also send the current global model parameters to each device that did not participate in the previous training round along with a training plan including, for example, gradient computation settings.

(3) Meta-location Generation and Training. Based on the configuration from the server 908, the devices 902-906 can perform initial meta-location generation. Subsequently, the devices 902-906 can use the global model received from the server 908 to compute gradients based on their respective processed data. Finally, the devices 902-906 can send the gradients back to the server 908 after finishing the gradient computation. As noted above, the devices 902-906 can send the gradients back to the server 908 at this stage without sending any underlying data used in the computation of the gradients, thereby protecting user privacy.

(4) Aggregation. Here, the server 908 can wait for the devices 902-906 to report gradient updates. Once received, the server 908 can aggregate the updates, e.g., using federated averaging, and update its global model weights with the aggregated gradients. The server 908 can then deploy the model to the devices 902-906 to ensure they have the latest model.

(5) Prediction. At this stage, the software on respective devices 902-906 can invoke the newly received FMLL model for predictions. Up to this stage, the devices 902-906 can use an older model, e.g., as obtained during a previous round. By generating and utilizing a single aggregated global model among all devices 902-906, model generation can be simplified, e.g., in contrast to a system in which models are tailored to individual user profiles.

In an implementation, the server 908 shown in diagram 900 can utilize data augmentation to improve the model performance, e.g., by increasing the extent to which the training data is independent and identically distributed (IID). In this implementation, the data from a small percentage of users (e.g., less than 5% of users) can be allocated as an augmentation dataset and made available to the server 908, and the server 908 can subsequently sample and share the data with other users. This can be done, e.g., for a small amount of users that affirmatively provide consent to share their data with the server 908.

Training with data augmentation can include three phases. First, the model can be trained with the augmentation dataset at the server 908. This model is then distributed to the devices 902-906 that will participate in FL training. Second, each device selected in every round can randomly select subsets of samples from the augmentation dataset and concatenate them with their own datasets. Third, on-device training can be conducted by initializing the model received from the server 908 (trained with the augmentation dataset) and further training the model with the augmented local data. The rest of the FL procedures can proceed in a similar manner to that described above.

Figure 10:
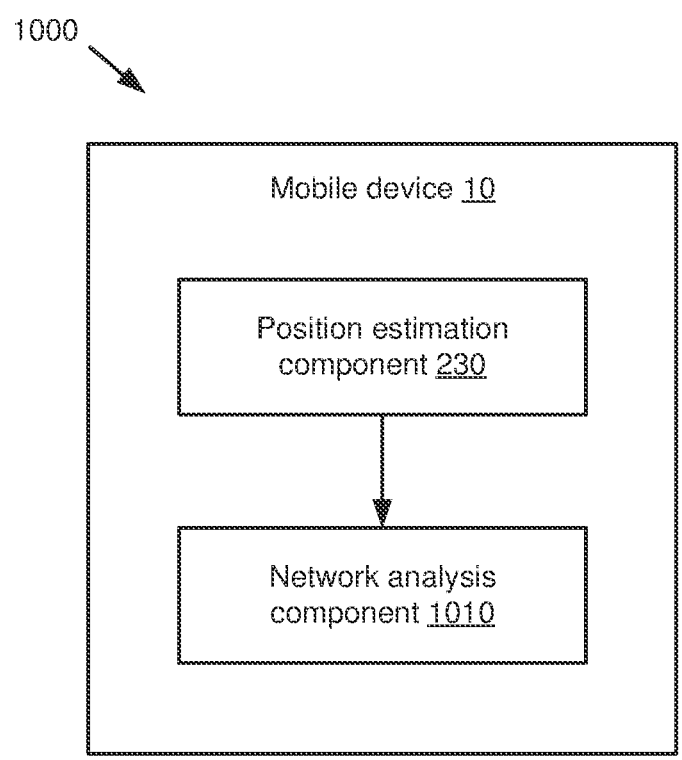
FIG. 10 is a block diagram of a system that facilitates estimation of future network conditions in accordance with various aspects described herein.

Referring next to FIG. 10, a block diagram of a system 1000 that facilitates estimation of future network conditions is illustrated. Repetitive description of like elements employed in other embodiments described herein is omitted for brevity. System 1000 as shown in FIG. 10 includes a mobile device 10, which in turn includes a position estimation component 230 that can determine an estimated future position of the mobile device 10, e.g., as described above. The mobile device 10 of system 1000 further includes a network analysis component 1010 that can predict a future network condition associated with the estimated future position of the mobile device 10 as determined by the position estimation component 230.

Predicted network conditions determined by the network analysis component 1010 can be utilized by one or more applications running on the mobile device 10 to improve overall device performance and user experience. For example, the mobile device 10 can use a map showing location-based quality of wireless network service to adapt video quality as a function of the predicted user locations. As another example, augmented reality applications are delay-sensitive and can benefit from fine-grained location prediction to speed up content rendering. Another example is context-aware applications that desirably adapt in advance based on where a user will move next, such as location-based gaming or advertising. For instance, location-based gaming could adapt in real time based on predicted user locations to be more interesting or challenging.

Figure 11:
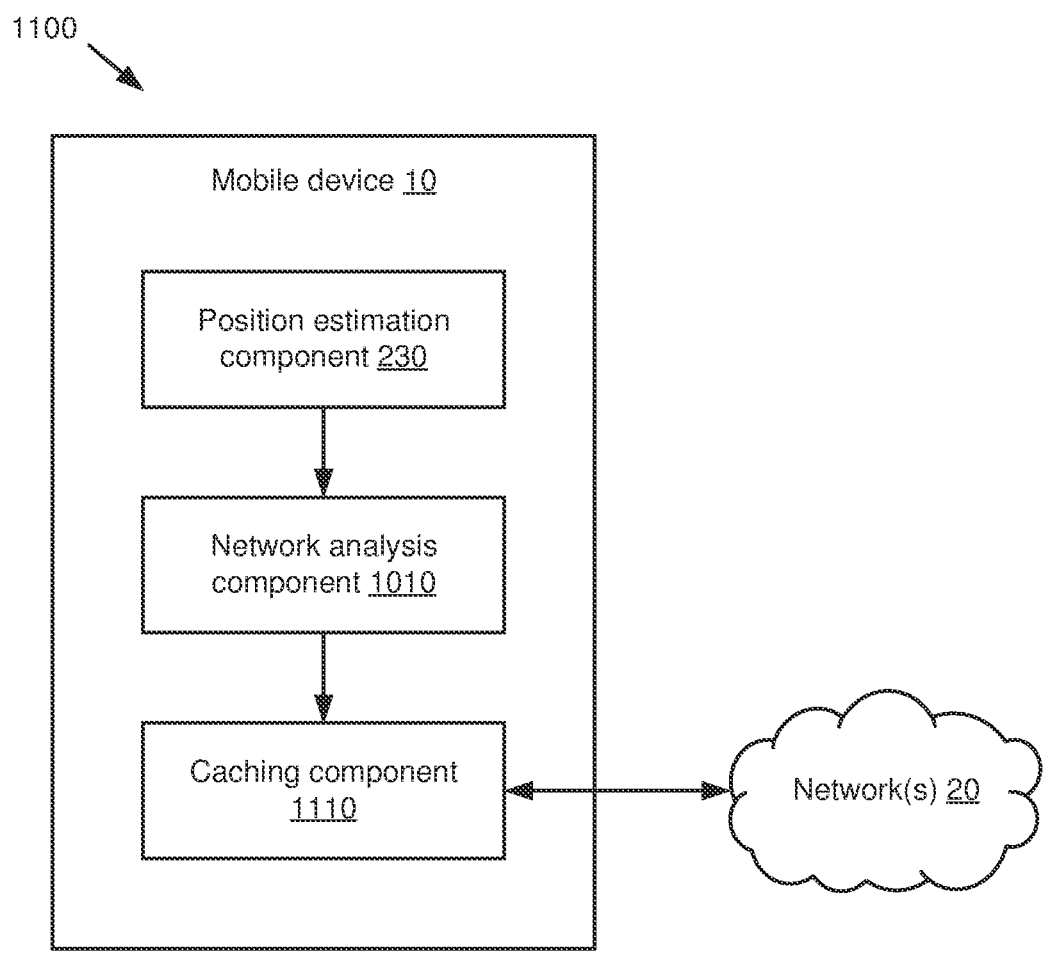
FIG. 11 is a block diagram of a system that facilitates predictive data caching in accordance with various aspects described herein.

As an additional example, as further shown by system 1100 in FIG. 11, the network analysis component 1010 can provide information regarding predicted network conditions to a caching component 1110, which can cache data (e.g., from one or more networks 20) associated with an application executing on the mobile device 10 based on a difference between network conditions presently observed by the mobile device 10 and the estimated future network conditions. Thus, for example, if a video streaming application or another suitable application determines that the mobile device 10 is predicted to move to a location with lower network quality, the application can proactively cache video frames and/or other data in order to maintain a consistent user experience.

In general, while the above implementations have been described in the use case of mobile devices 10 such as smartphones, the meta-location generation and prediction model described above could also be used in data centers by network and service providers that already have user location data (e.g., from triangulation or the like). For example, cellular network providers could employ a model as described above to optimize handover in 5G. Similarly, network operators could use location prediction as described above to perform massive multiple-input multiple-output (MIMO antenna adjustment, e.g., by dynamically optimizing the weights of antenna elements in 5G for optimal signal coverage while incurring minimal interference from other users. Other use cases for the above model framework that could be employed by a network operator can include, but are not limited to, load balancing, scheduling, synchronization, topology, power control, resource allocation, handover, or the like.

Additionally, FMLL as described above could be incorporated directly into the operating system of a smartphone or other mobile device, e.g., to improve system and/or application performance using location prediction. In addition, location prediction from multiple systems could be fused based on the model framework described above. For example, GPS-based location prediction could be fused with location prediction performed by wireless network providers, e.g., based on 5G signal fingerprinting techniques. This can, in turn, further improve user experience in real-world applications such as augmented reality, mobile gaming, video streaming, or the like.

Figure 12:
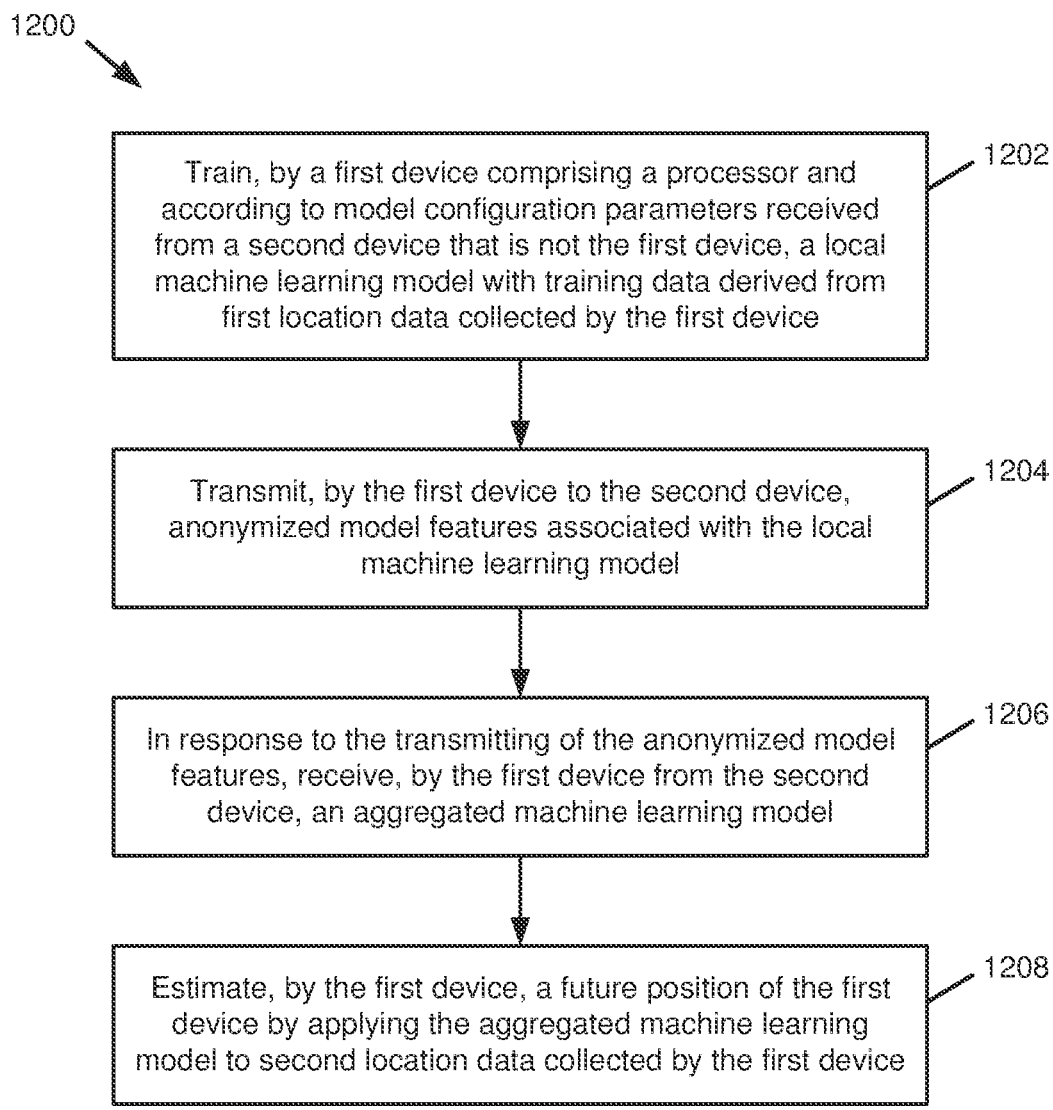
FIG. 12 is a flow diagram of a method that facilitates AI automation to improve network quality based on predicted locations in accordance with various aspects described herein.

With reference now to FIG. 12, a flow diagram of a method 1200 that facilitates AI automation to improve network quality based on predicted locations is presented. At 1202, a first device comprising a processor (e.g., a mobile device 10 comprising a processor 14, and/or a system including such a device) can train (e.g., by a local training component 210 and/or other components implemented by the processor 14), according to model configuration parameters received from a second device (e.g., a server 30) that is not the first device, a machine learning model with training data (e.g., meta-location data) derived from first location data collected by the first device.

At 1204, the first device can transmit (e.g., by a server interface component 220 and/or other components implemented by the processor 14) anonymized model features associated with the local machine learning model trained at 1202 to the second device.

At 1206, in response to the transmitting of the anonymized model features at 1204, the first device can receive (e.g., by the server interface component 220) an aggregated machine learning model from the second device.

At 1208, the first device can estimate (e.g., by a position estimation component 230 and/or other components implemented by the processor 14) a future position of the first device by applying the aggregated machine learning model received at 1206 to second location data collected by the first device.

FIG. 12 illustrates a method in accordance with certain aspects of this disclosure. While, for purposes of simplicity of explanation, the method is shown and described as a series of acts, it is noted that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 13:
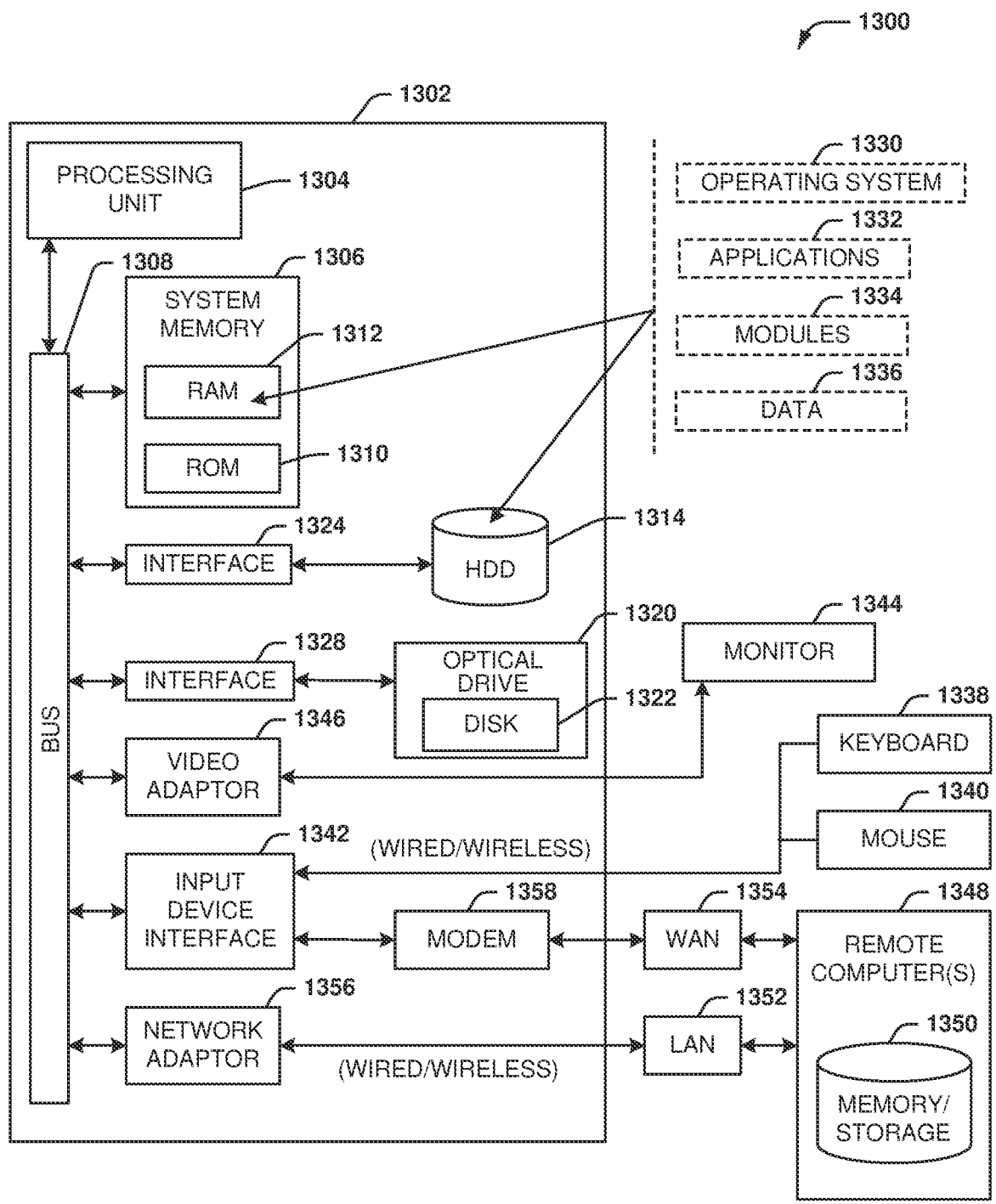
FIG. 13 depicts an example computing environment in which various embodiments described herein can function.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 and an optical disk drive 1320, (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314 and optical disk drive 1320 can be connected to the system bus 1308 by an HDD interface 1324 and an optical drive interface 1328, respectively. The HDD interface 1324 can additionally support external drive implementations via Universal Serial Bus (USB), Institute of Electrical and Electronics Engineers (IEEE) 1394, and/or other interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it is noted by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) can include a microphone, an infrared (IR) remote control, a joystick, a game pad, a stylus pen, touch screen or the like. These and other input devices are often connected to the processing unit 1304 through an input device interface 1342 that can be coupled to the system bus 1308, but can be connected by other interfaces, such as a parallel port, an IEEE 1394 serial port, a game port, a USB port, an IR interface, a BLUETOOTH® interface, etc.

A monitor 1344 or other type of display device can be also connected to the system bus 1308 via an interface, such as a video adapter 1346. In addition to the monitor 1344, a computer typically includes other peripheral output devices (not shown), such as speakers, printers, etc.

The computer 1302 can operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1352 through a wired and/or wireless communication network interface or adapter 1356. The adapter 1356 can facilitate wired or wireless communication to the LAN 1352, which can also include a wireless access point (AP) disposed thereon for communicating with the wireless adapter 1356.

When used in a WAN networking environment, the computer 1302 can include a modem 1358 or can be connected to a communications server on the WAN 1354 or has other means for establishing communications over the WAN 1354, such as by way of the Internet. The modem 1358, which can be internal or external and a wired or wireless device, can be connected to the system bus 1308 via the input device interface 1342. In a networked environment, program modules depicted relative to the computer 1302 or portions thereof, can be stored in the remote memory/storage device 1350. It will be appreciated that the network connections shown are example and other means of establishing a communications link between the computers can be used.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

training, by a first device comprising a processor and according to model configuration parameters received from a second device that is not the first device, a local machine learning model with training data derived from first location data collected by the first device;

transmitting, by the first device to the second device, anonymized model features associated with the local machine learning model;

in response to the transmitting of the anonymized model features, receiving, by the first device from the second device, an aggregated machine learning model; and estimating, by the first device, a future position of the first device by applying the aggregated machine learning model to second location data collected by the first device.

2. The method of claim 1, wherein the first location data comprises a first data sequence representative of physical locations of the first device, collected at intervals of a period, within an area, and wherein the method further comprises:

determining, by the first device, a second data sequence representative of amounts of relative displacement of the first device between the physical locations represented in the first data sequence; and determining, by the first device, an occupancy matrix representative of frequencies at which the physical locations represented in the first data sequence are located within respective defined sub-areas of the area, wherein the training data comprises the second data sequence and the occupancy matrix.

3. The method of claim 2, wherein the aggregated machine learning model comprises a first sub-model and a second sub-model, and wherein the estimating comprises:

applying the second data sequence to the first sub-model, resulting in a first intermediate output;

applying the occupancy matrix to the second sub-model, resulting in a second intermediate output; and estimating the future position of the first device based on a result of fusing the first intermediate output and the second intermediate output.

4. The method of claim 3, wherein the first sub-model is a sequence prediction neural network, and wherein the second sub-model is a visual feature prediction neural network.

5. The method of claim 1, wherein the transmitting of the anonymized model features comprises transmitting the anonymized model features to the second device without transmitting any of the first location data to the second device and without transmitting any of the training data to the second device.

6. The method of claim 1, wherein the estimating comprises determining an estimated future position of the first device, and wherein the method further comprises:

predicting, by the first device, a future network condition associated with the estimated future position of the first device.

7. The method of claim 6, further comprising:

based on a difference between a network condition observed by the first device and the future network condition associated with the estimated future position of the first device, caching, by the first device, data associated with an application executing on the first device.

8. The method of claim 1, wherein the anonymized model features are first anonymized model features, and wherein the aggregated machine learning model is based on the first anonymized model features and second anonymized model features associated with a third device that is distinct from the first device and the second device.

9. The method of claim 1, further comprising:

registering, by the first device, with the second device; and receiving, by the first device in response to the registering, the model configuration parameters from the second device.

10. A system, comprising:

a processor; and a memory that stores executable instructions that, when executed by the processor, facilitate performance of operations, comprising:

training, based on configuration parameters received from network equipment that is distinct from the system, a local machine learning model with training data based on first location data associated with the system;

sending, to the network equipment, anonymized model data associated with the local machine learning model;

in response to the sending of the anonymized model data, receiving, from the network equipment, a global machine learning model; and estimating a future position associated with the system by applying the global machine learning model to second location data associated with the system.

11. The system of claim 10, wherein the first location data comprises a first sequence representative of physical locations, within an area and associated with the system, as collected at intervals of a period, and wherein the operations further comprise:

determining a second sequence representative of amounts of relative displacement between the physical locations represented in the first sequence; and determining a matrix representative of frequencies at which the physical locations represented in the first sequence are located within respective defined sub-areas of the area, wherein the training data comprises the second sequence and the matrix.

12. The system of claim 11, wherein the global machine learning model comprises a first sub-model and a second sub-model, and wherein the estimating comprises:

applying the second sequence to the first sub-model, resulting in a first intermediate output;

applying the matrix to the second sub-model, resulting in a second intermediate output; and estimating the future position associated with the system based on a result of fusing the first intermediate output and the second intermediate output.

13. The system of claim 10, wherein the operations further comprise:

predicting a future network condition corresponding to the future position associated with the system, resulting in a predicted future network condition.

14. The system of claim 13, wherein the operations further comprise:

based on a difference between a present network condition associated with the system and the predicted future network condition, caching data associated with an application associated with the system.

15. The system of claim 10, wherein the operations further comprise:

registering the system with the network equipment; and receiving the configuration parameters from the network equipment in response to the registering.

16. A non-transitory machine-readable medium, comprising executable instructions that, when executed by a processor of first network equipment, facilitate performance of operations, comprising:
- based on model configuration data received from second network equipment that is distinct from the first network equipment, training a local data model with training data derived from first location data collected by the first network equipment;
- transmitting, to the second network equipment, anonymized model parameter data associated with the local data model; and
- determining an estimated future position of the first network equipment by applying a global data model, received from the second network equipment in response to the transmitting, to second location data collected by the first network equipment.

17. The non-transitory machine-readable medium of claim 16, wherein the first location data comprises a first data sequence representative of locations of the first network equipment, within an area and as determined at intervals of a period, and wherein the operations further comprise:
- determining a second data sequence representative of relative displacement of the first network equipment between the locations represented in the first data sequence; and
- determining a histogram matrix representative of frequencies at which the locations represented in the first data sequence are within respective defined sub-areas of the area, wherein the training data comprises the second data sequence and the histogram matrix.

18. The non-transitory machine-readable medium of claim 17, wherein the global data model comprises a first neural network and a second neural network, and wherein the determining of the estimated future position comprises:
- applying the second data sequence to the first neural network, resulting in a first output;
- applying the histogram matrix to the second neural network, resulting in a second output; and
- determining the estimated future position of the first network equipment based on the first output and the second output.

19. The non-transitory machine-readable medium of claim 16, wherein the operations further comprise:
- determining predicted future network conditions associated with the estimated future position of the first network equipment; and
- based on a difference between present network conditions observed by the first network equipment and the predicted future network conditions, caching data associated with an application associated with the first network equipment.

20. The non-transitory machine-readable medium of claim 16, wherein the operations further comprise:
- registering the first network equipment with the second network equipment; and
- receiving the model configuration data from the second network equipment in response to the registering.

\* \* \* \* \*